Figure 1:
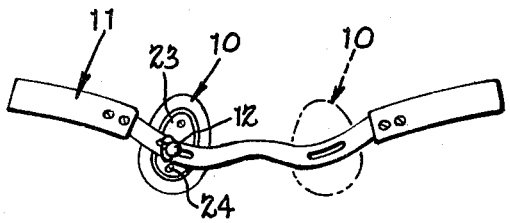

Aug. 9, 1966  E. J. GRUBER  3,265,064
TRUSS PAD AND METHOD OF MANUFACTURE
Filed Sept. 18, 1964

INVENTOR.
Elmer J. Gruber
BY
Wood, Herron & Evans
ATTORNEYS.

United States Patent Office 3,265,064
Patented August 9, 1966

3,265,064
TRUSS PAD AND METHOD OF MANUFACTURE
Elmer J. Gruber, Cincinnati, Ohio, assignor to Surgical Appliance Industries, Inc., Cincinnati, Ohio, a corporation of Ohio
Filed Sept. 18, 1964, Ser. No. 397,441
6 Claims. (Cl. 128—95)

The present invention relates to truss pads and is particularly directed to a novel molded truss pad and to a method of manufacturing such pads.

In the past it has been conventional to form truss pads by assembling a plurality of components to form a finished pad. More particularly, two prior forms of conventional truss pad construction are shown in I. M. Pease Patent No. 1,607,208 and W. A. Pease Patent No. 2,557,309. As shown in Pease Patent No. 1,607,208 a common form of truss pad includes a main body portion formed of sponge rubber covered with a rubber sheath and a small head overlying one wall of the pad. The head is formed of rubber, or the like, and is covered with a cloth. The cloth surrounds the head and is tucked under the sheath where it is held in place between the sheath and the sponge rubber core.

In addition to these elements a truss pad conventionally includes a rigid metal base plate as is shown in Pease Patent No. 2,557,309. This base plate is slipped under the cover, or sheath, and is bolted to an outside metal cover plate which clamps against a peripheral skirt portion of the rubber sheath to hold the base plate in position.

The present invention is directed to a novel truss pad which eliminates several defects of conventional truss pads of the type described. More particularly, prior art truss pads are difficult to make and require a considerable amount of hand labor. Moreover, after a period of usage the pads tend to become damaged. Specifically, the material holding the head in position frequently slips out of the opening of the sheath. Also, the cover skirt which is clamped between the base plate and cover plate tends to tear. Still another defect of the prior art truss pads is that relative shifting movement occurs between the plate and remaining portion of the pad. As a result, the pad is ineffective to apply the proper pressure at the desired position.

The present invention is predicated upon the concept of molding a pad including an integral cover, head and base plate. The base plate is embedded in a rear wall of the cover and the cover is filled with a foamed in place latex composition which expands and bonds to the cover to form an integral assembly which is completed by bolting a rear cover member to the base plate.

In accordance with the present invention the truss pad is manufactured by pre-molding a head member from a material having the desired degree of hardness. This head member is subsequently placed in a mold together with a suitable vinyl dispersion and a metal base plate which is secured within the mold in spaced relationship to one wall thereof. The mold is then heated and rapidly rotated in different directions to rotationally cast the hollow cover member. The cover member bonds to the head member and envelopes the metal base plate. After the cover member has set, it is removed from the mold and a foamed in place latex composition is inserted into the hollow cover by means of a hollow needle-like implement. This latex composition expands and sets to form a cellular sponge-like core which completely fills the interior portion of the cover and forms a firm pad in which the backing plate is completely immobilized. Subsequently, a conventional metal mounting plate and metal rear cover member are bolted to the backing plate.

One of the principal advantages of the present truss pad is that it is very durable and even after periods of extended usage remains effective to apply pressure to the exact area of the wearer's body desired.

More particularly, in the present truss pad the metal backing plate is encased within the rear wall of the cover and cannot shift about relative to the pad. Moreover, the head is molded integral with the cover and cannot be shifted relative to the cover. Also, there is no loosely held fabric to slip free or to bunch.

Another advantage of the present truss pad is that although it is superior in construction to the previous hand assembled pads, it is nevertheless far more economical to produce.

Another advantage of the present pad is that the rear wall is formed of thicker construction than the remaining areas of the wall. Consequently, the cover does not tear in the area in which it is clamped between the base plate and cover plate.

A still further advantage of the present pad is that it is substantially waterproof which makes the pad easier to clean and eliminates problems of corrosion of the base plate.

These and other objects and advantages of the present invention will be more readily apparent from a consideration of the following detailed description of the drawings illustrating a preferred embodiment of the invention.

Figures 2, 3, 4:
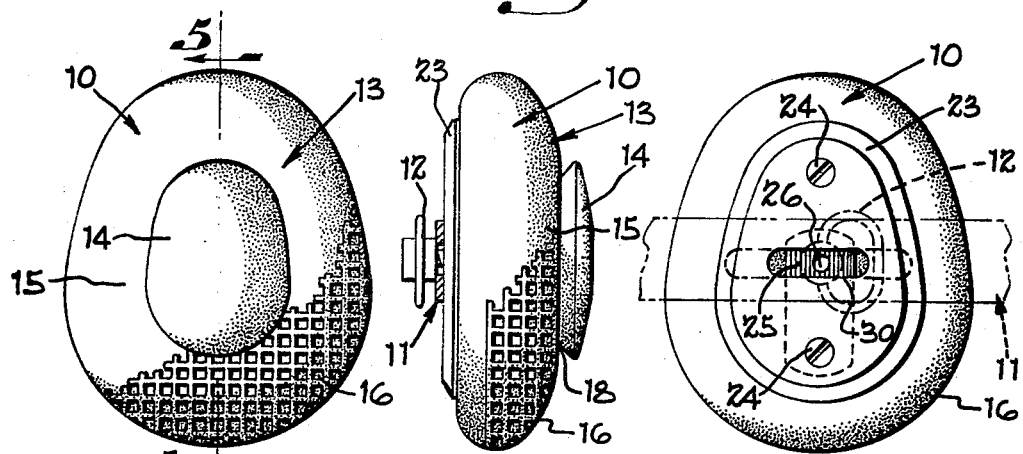
Figure 5:
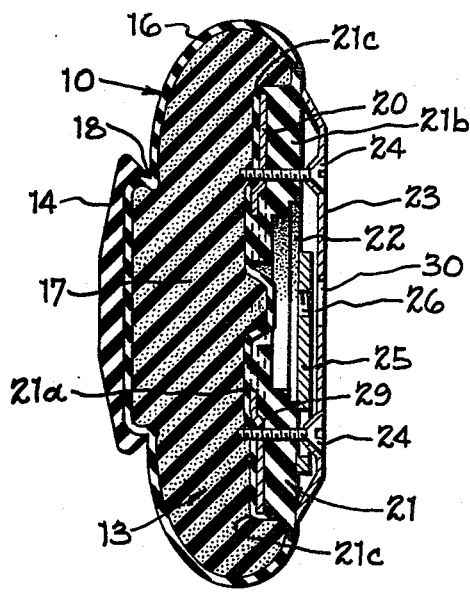
Figure 6:
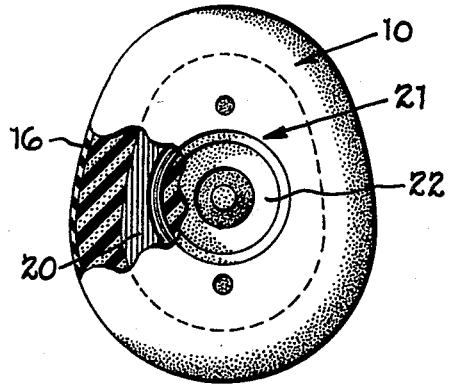

In the drawings:
FIGURE 1 is a front elevational view of a truss fitted with the pads of the present invention.
FIGURE 2 is a front elevational view of a truss pad of the present invention.
FIGURE 3 is a side elevational view of the truss pad.
FIGURE 4 is a rear view of the truss pad.
FIGURE 5 is a cross sectional view taken along line 5—5 of FIGURE 2.
FIGURE 6 is a rear elevational view with the cover plate removed and a portion of the pad broken away to show details of construction.

As is shown in FIGURE 1, the truss pad 10 of the present invention is adapted to be mounted upon a truss 11 in a conventional manner, such as by means of bolts 12. The truss is adapted to fit around the body of a wearer to position a pad, or pads, 10 in contact with the area of the wearer to be supported. It is to be expressly understood that the construction of the truss 11 constitutes no part of the present invention which is directed solely to the structure of the individual pads 10.

The details of construction of the present pads are best shown in FIGURES 2-5. More particularly, as there shown, pad 10 comprises a main body portion 13 and a head 14 formed on the front face 15 of the main body portion. The main body portion is of generally oval or pear-shaped configuration and includes a molded plastic covering 16 formed of vinyl or the like. This covering, or skin, preferably has a reticulated surface effective to minimize slippage of the pad over the skin of the wearer. The interior of main body portion 13 is filled with a suitable resilient core, preferably a foamed in place open cellular latex composition.

The front face 15 of the pad carries head 14 which extends outwardly from the pad and is effective to exert concentrated pressure on a small area of the wearer's body. In accordance with the present invention, head 14 is molded integral with skin 16 and is preferably formed of a material softer than the skin but firmer than the foamed core 17. The periphery of head 14 is preferably undercut as shown at 18. This permits the main body of the truss pad and head 14 to be met in a relatively smooth line when the pad is worn, thereby providing maximum comfort for the wearer.

At the rear surface of the pad a flat base plate 20 is enclosed in a compartment formed in the thickened rear wall 21 of cover member 16. Specifically, the plate is disposed between rear wall portion 21a and intermediate wall portion 21b and is surrounded peripherally by marginal wall portions 21c. The plate is thus held substantially immovable with respect to the remaining elements of the truss pad. Rear wall 21 of covering 16 is provided with an enlarged central opening 22 which extends inwardly from the rearmost surface of the pad to the base plate. A rear cover plate 23 is mounted over opening 22 and overlies a substantial portion of back wall 21. This rear cover plate is bolted, as by means of bolts 24, to base plate 20. A threaded mounting disc 25 is disposed beneath the cover plate and is provided with one or more suitable threaded apertures 26 for receiving mounting bolts carried by truss 11, the mounting bolts engaging the threaded aperture in the mounting plate through a central opening 30 formed in rear cover plate 23.

The present pad is manufactured utilizing a method of rotational casting described generally in R. P. Molitor Patent No. 2,629,134. Suitable forms of apparatus for carrying out the method are shown in Martin Patent No. 2,629,131 and Rekettye Patent No. 2,893,057. More particularly, in accordance with the present invention, head 14 is premolded of a suitable plastic, such as a vinyl copolymer, having the desired degree of hardness; for example, 20 to 30 durometer on the "A" scale. A quantity of liquid resin and a suitable plasticizer for forming skin 16 of a suitable durometer; e.g. 50-60 durometer on the "A" scale, is inserted together with head 14 and a plate 20 in a hollow mold having the desired configuration of the finished truss pad. The resin, plasticizer, head and plate only partially fill the mold. The mold is heated to bring the resin to the gel point. Thereafter, the mold is rapidly rotated in a plurality of planes until fusion takes place and the head member 14 is bonded to a skin 16 which forms a hollow member having the outline configuration of the truss pad.

During the rotational casting operation, base plate 20 is held within the mold spaced from the rear wall thereof by means of removable threaded pins which extend into the mold from the rear face thereof. The pins threadably engage openings 29 in the base plate 20 and support it in parallel spaced relationship with a wall of the mold cavity. As a result, when the rear wall 21 structure is formed, the metal base plate becomes embedded between sections 21a and 21b of the rear wall 21 as shown in FIGURE 5.

After the skin 16 has set, it is removed from the mold. A foamed in place latex composition is then inserted into the interior of the skin 16. This latex is inserted by means of a hollow needle which pierces skin 16. After the needle is removed, the latex expands, foams and sets to form an open cellular sponge-like core which bonds to the interior walls of skin 16. To complete the truss pad, a mounting plate is placed against the rear wall and a cover plate 23 is secured over the plate by threading bolts 24 inwardly through suitable openings in the cover plate and openings molded in rear wall 21 into contact with the threaded apertures formed in the base plate 20. Finally, the assembled pads are mounted upon a truss in any suitable manner.

From the above disclosure of the general principles of the present invention and the above description of a preferred embodiment, those skilled in the are will readily comprehend various modifications to which the invention is susceptible. Therefore, I desire to be limited only by the scope of the following claims.

Having described my invention, I claim:

1. A truss pad comprising a main body portion, said body portion including a molded skin having a front wall portion and a rear wall portion, a backing plate embedded in said rear wall portion, a plastic head member extending outwardly from said front wall portion, said head member being fused integrally with said skin member, a foamed in place cellular material filling said skin, and means including a rear cover plate bolted to said backing plate for mounting said truss pad upon a truss.

2. A truss pad comprising a main body portion, said body portion including a molded skin haivng a front wall portion and a rear wall portion, said rear wall portion being thicker than said front wall portion, a backing plate embedded in said rear wall portion, a plastic head member extending outwardly from said front wall portion, said head member being fused integrally with said skin member, a foamed in place cellular material filling said skin, and means including a rear cover plate bolted to said backing plate for mounting said truss pad upon a truss.

3. A truss pad comprising a main body portion, said body portion including a molded skin having a front wall portion and a rear wall portion, a backing plate embedded in said rear wall portion, a plastic head member extending outwardly from said front wall portion, said head member being fused integrally with said skin member, a foamed in place cellular material filling said skin, and means including a rear cover plate bolted to said backing plate for mounting said truss pad upon a truss, said head member being softer than said skin and harder than said cellular material.

4. A truss pad comprising a main body portion, said body portion including a molded skin having a front wall portion and a rear wall portion, a backing plate embedded in said rear wall portion, a head member extending outwardly from said front wall portion, said head member being fused integrally with said skin member, a foamed in place cellular material filling said skin and bonding thereto, and means including a rear cover plate bolted to said backing plate for mounting said truss pad upon a truss.

5. A method of manufacturing a truss pad, said method comprising the steps of molding a plastic head member, inserting said head member in a mold for rotational casting, mounting a metal backing plate within said mold spaced from a wall thereof remote from said head member, inserting a liquid mixture of a vinyl resin and a plasticizer therefore within said mold, said liquid mixture being less in volume than the volume of said mold, heating the closed mold and rotating said mold in a plurality of planes to cause the mixture to gel as a layer over the inner surface of the mold, and around said backing plate, and causing the vinyl layer to fuse to the head member, subsequently cooling the mold and removing the truss pad therefrom, and thereafter injecting a foamed in place cellular material into the interior of said truss pad.

6. A method of manufacturing a truss pad, said method comprising the steps of molding a plastic button-like head member, inserting said head member in a mold for rotational casting, mounting a metal backing plate within said mold spaced from a wall thereof remote from said head member, said metal backing plate being supported upon two bolts threadably engaging spaced openings in said backing plate, inserting a liquid mixture of a vinyl resin and a plasticizer therefore within said mold, said liquid mixture being less in volume than the volume of said mold, heating the closed mold and rotating said mold in a plurality of planes to cause the mixture to gel as a layer over the inner surface of the mold and around said backing plate, and causing the vinyl layer to fuse to the head member, subsequently cooling the mold and removing the truss therefrom, thereafter injecting a foamed in place cellular material into the interior of said truss pad, and then assembling truss mounting means upon said truss pad by inserting bolts into the same spaced openings in said backing plate utilized to support said plate in said mold.

No references cited.

ADELE M. EAGER, *Primary Examiner.*